US012016109B2

(12) United States Patent
Lee et al.

(10) Patent No.: US 12,016,109 B2
(45) Date of Patent: Jun. 18, 2024

(54) PLASMA GENERATOR

(71) Applicant: Samsung Electronics Co., Ltd., Suwon-si (KR)

(72) Inventors: Changyun Lee, Hwaseong-si (KR); Myoungsoo Kim, Hwaseong-si (KR); Sangchul Han, Suwon-si (KR); Daeman Seo, Osan-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 212 days.

(21) Appl. No.: 17/748,152

(22) Filed: May 19, 2022

(65) Prior Publication Data

US 2023/0060486 A1 Mar. 2, 2023

(30) Foreign Application Priority Data

Aug. 27, 2021 (KR) ........................ 10-2021-0113700

(51) Int. Cl.
*H05H 1/46* (2006.01)

(52) U.S. Cl.
CPC .................................. *H05H 1/466* (2021.05)

(58) Field of Classification Search
None
See application file for complete search history.

(56) References Cited

U.S. PATENT DOCUMENTS 9,721,757 B2 * 8/2017 Forster .............. H01J 37/32568
10,121,655 B2 * 11/2018 Subramani ........ H01J 37/32541
10,262,888 B2 * 4/2019 Gangakhedkar ............................ C23C 16/45544
10,861,736 B2 * 12/2020 Gangakhedkar ............................ C23C 16/45551
10,879,042 B2 * 12/2020 Subramani .......... H01J 37/3244
10,998,209 B2 * 5/2021 Brezoczky ........ H01L 21/68764
11,587,766 B2 * 2/2023 Ramaswamy .... H01J 37/32018
11,594,428 B2 * 2/2023 Tran .................. H01L 21/67248
11,600,507 B2 * 3/2023 Prasad .............. H01L 21/68735
11,610,799 B2 * 3/2023 Prasad .............. H01L 21/67103
11,705,312 B2 * 7/2023 Tanaka ............. H01J 37/32522 156/345.37
11,721,527 B2 * 8/2023 Subbuswamy ... H01L 21/30604 427/98.8
11,817,331 B2 * 11/2023 Yedla ................ H01L 21/67346
11,826,873 B2 * 11/2023 Venkatagiriyappa ........................ C23C 16/4407
2009/0025879 A1 1/2009 Rauf et al.
(Continued)

*Primary Examiner* — Srinivas Sathiraju
(74) *Attorney, Agent, or Firm* — Harness, Dickey & Pierce, P.L.C.

(57) ABSTRACT

A plasma generator includes a coaxial tube assembly, a radio frequency (RF) electrode, and a feed including an inner circumferential surface that defines a first and second recesses at opposite, first and second ends of the feed. A first protrusion of the coaxial tube assembly is coupled to the first recess of the feed. A second protrusion of the coaxial tube assembly is coupled to the second recess of the feed. The feed includes first and second inner surfaces that define first and second insertion grooves in the inner circumferential surface at the first and second ends of the feed, respectively. First and second coil springs are at least partially within the first and second insertion grooves, respectively. The coaxial tube assembly, the RF electrode, and the feed provide an RF power transmission path based on the feed being coupled between the coaxial tube assembly and the RF electrode.

20 Claims, 16 Drawing Sheets

(56) References Cited

U.S. PATENT DOCUMENTS

| | | | | |
|---|---|---|---|---|
| 2009/0274590 | A1* | 11/2009 | Willwerth | H01L 21/68792 422/186.04 |
| 2011/0132121 | A1* | 6/2011 | Park | F16H 63/3466 74/473.15 |
| 2011/0286266 | A1* | 11/2011 | Cho | G11C 16/0483 365/185.02 |
| 2016/0237563 | A1* | 8/2016 | Sieber | C23C 16/4412 |
| 2017/0213701 | A1 | 7/2017 | Subramani et al. | |
| 2017/0263421 | A1* | 9/2017 | Ikeda | H01J 37/32266 |
| 2018/0330927 | A1* | 11/2018 | Bera | H01L 21/68764 |
| 2019/0189404 | A1 | 6/2019 | Bera et al. | |
| 2019/0189498 | A1* | 6/2019 | Gangakhedkar | H01L 21/68785 |
| 2021/0210312 | A1* | 7/2021 | Subramani | H01J 37/3244 |
| 2023/0060486 | A1* | 3/2023 | Lee | H05H 1/466 |
| 2023/0091161 | A1* | 3/2023 | Oh | H01J 37/32165 315/111.21 |
| 2023/0117953 | A1* | 4/2023 | Oh | H01J 37/3211 118/723 I |

* cited by examiner

PLASMA GENERATOR

CROSS-REFERENCE TO RELATED APPLICATION

This application claims benefit of priority under 35 U.S.C. § 119 to Korean Patent Application No. 10-2021-0113700 filed on Aug. 27, 2021 in the Korean Intellectual Property Office, the disclosure of which is incorporated herein by reference in its entirety.

BACKGROUND

The present inventive concepts relate to plasma generators.

Plasma generators may generate plasma in a process chamber, and the generated plasma may be used to generate a thin film on a wafer. In order to prevent deterioration of process quality, research into generating stable plasma has been actively conducted.

SUMMARY

Some example embodiments of the present inventive concepts provide a plasma generator in which contact resistance in a contact portion between heterogeneous components present in a radio frequency (RF) power transmission path is reduced and a firm fastening structure is provided. Radio frequency (RF) power generated by an RF power supply device is transmitted to an RF electrode through a coaxial line and a feed, and plasma may be generated around the RF electrode. The feed may be placed between the coaxial line and the RF electrode, and these components may make physical surface contact (e.g., may contact each other) to form an RF power transmission path. Contact characteristics of the contact portion may be improved according to the plasma generator of the example embodiments of the inventive concepts, such that stable plasma may be generated based the improved contact characteristics of the contact portion.

According to some example embodiments of the present inventive concepts, a plasma generator may include a coaxial tube assembly including a first protrusion at one end of the coaxial tube assembly; a radio frequency (RF) electrode including a second protrusion at one end of the RF electrode; and a feed including an inner circumferential surface that defines a first recess at a first end of the feed and a second recess at a second end of the feed, the second end of the feed being an opposite end of the feed in relation to the first end of the feed. The first protrusion of the coaxial tube assembly may be coupled to the first recess of the feed, and the second protrusion of the RF electrode may be coupled to the second recess of the feed. The feed may include one or more first inner surfaces that define a first insertion groove in the inner circumferential surface of the feed at the first end of the feed and one or more second inner surfaces that define a second insertion groove in the inner circumferential surface of the feed at the second end of the feed. The plasma generator may further include a first coil spring that is at least partially within the first insertion groove and a second coil spring that is at least partially within the second insertion groove. The coaxial tube assembly, the RF electrode, and the feed may be configured to provide an RF power transmission path based on the feed being coupled between the coaxial tube assembly and the RF electrode.

According to some example embodiments of the present inventive concepts, a plasma generator may include a coaxial tube assembly including a first inner circumferential surface that defines a first recess at one end of the coaxial tube assembly; a feed including a first protrusion at a first end of the feed and a second protrusion at a second end of the feed, the second end of the feed being an opposite end of the feed in relation to the first end of the feed; and a radio frequency (RF) electrode including a second inner circumferential surface that defines a second recess at one end of the RF electrode. The first protrusion of the feed may be coupled to the first recess of the coaxial tube assembly, and the second protrusion of the feed may be coupled to the second recess of the RF electrode. The coaxial tube assembly may include one or more first inner surfaces that define a first insertion groove in the first inner circumferential surface at the one end of the coaxial tube assembly. The RF electrode may include one or more second inner surfaces that define a second insertion groove in the second inner circumferential surface at the one end of the RF electrode. The plasma generator may further include a first coil spring that is at least partially within the first insertion groove and a second coil spring that is at least partially within the second insertion groove. The coaxial tube assembly, the RF electrode, and the feed may be configured to provide an RF power transmission path based on the feed being coupled between the coaxial tube assembly and the RF electrode.

According to some example embodiments of the present inventive concepts, a plasma generator may include a coaxial tube assembly including a first inner circumferential surface that defines a first recess at one end of the coaxial tube assembly; a feed including a first protrusion at a first end of the feed and a second inner circumferential surface that defines a second recess at a second end of the feed, the second end of the feed being an opposite end of the feed in relation to the first end of the feed; and a radio frequency (RF) electrode including a second protrusion at one end of the RF electrode. The first protrusion of the feed may be coupled to the first recess of the coaxial tube assembly, and the second protrusion of the RF electrode may be coupled to the second recess of the feed. The coaxial tube assembly may include one or more first inner surfaces that define a first insertion groove in the first inner circumferential surface at the one end of the coaxial tube assembly. The feed may include one or more second inner surfaces that define a second insertion groove in the second inner circumferential surface at the second end of the feed. The plasma generator may further include a first coil spring that is at least partially within the first insertion groove and a second coil spring that is at least partially within the second insertion groove. The coaxial tube assembly, the RF electrode, and the feed may be configured to provide an RF power transmission path based on the feed being coupled between the coaxial tube assembly and the RF electrode.

BRIEF DESCRIPTION OF DRAWINGS

The above and other aspects, features, and advantages of the present inventive concepts will be more clearly understood from the following detailed description, taken in conjunction with the accompanying drawings, in which.

DETAILED DESCRIPTION

Figure 1:
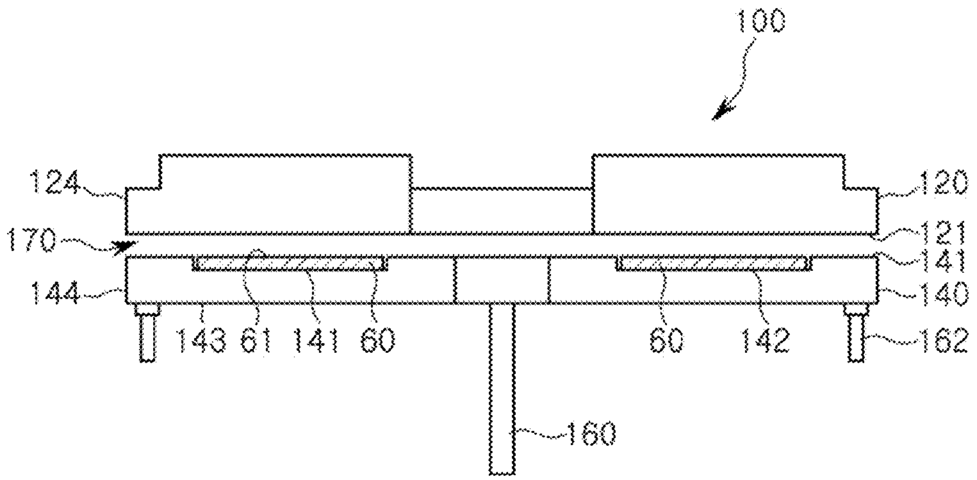
FIG. 1 is a cross-sectional view of a substrate processing system according to some example embodiments of the present inventive concepts.

In the present description, the terms "substrate" and "wafer" may be used interchangeably.

Hereinafter, example embodiments of the present inventive concepts are described with reference to the accompanying drawings.

It will be understood that when an element such as a layer, film, region, or substrate is referred to as being "on" another element, it may be directly on the other element or intervening elements may also be present. In contrast, when an element is referred to as being "directly on" another element, there are no intervening elements present. It will further be understood that when an element is referred to as being "on" another element, it may be above or beneath or adjacent (e.g., horizontally adjacent) to the other element.

It will be understood that elements and/or properties thereof (e.g., structures, surfaces, directions, or the like), which may be referred to as being "perpendicular," "parallel," "coplanar," or the like with regard to other elements and/or properties thereof (e.g., structures, surfaces, directions, or the like) may be "perpendicular," "parallel," "coplanar," or the like or may be "substantially perpendicular," "substantially parallel," "substantially coplanar," respectively, with regard to the other elements and/or properties thereof.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%).

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%).

Elements and/or properties thereof (e.g., structures, surfaces, directions, or the like) that are "substantially coplanar" with regard to other elements and/or properties thereof will be understood to be "coplanar" with regard to the other elements and/or properties thereof within manufacturing tolerances and/or material tolerances and/or have a deviation in magnitude and/or angle from "coplanar," or the like with regard to the other elements and/or properties thereof that is equal to or less than 10% (e.g., a. tolerance of ±10%)).

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

FIG. 1 is a diagram illustrating a cross-sectional view of a substrate processing system 100 according to some example embodiments of the present inventive concepts.

Referring to FIG. 1, the substrate processing system 100 may include a gas distribution assembly 120 and a susceptor assembly 140. The gas distribution assembly 120 may be any type of gas delivery device used in the substrate processing system 100, and the gas distribution assembly 120 may also be referred to as an injector or an injector assembly. The gas distribution assembly 120 may include a front surface 121 facing the susceptor assembly 140. The front surface 121 may include any number or variety of openings for delivering a flow of gases towards the susceptor assembly 140. The gas distribution assembly 120 may include an outer circumferential edge 124 (also referred to herein as an outer peripheral edge) which may be circular or substantially circular.

In the substrate processing system 100, a gap 170 between the susceptor assembly 140 and the gas distribution assembly 120 may be controlled. The gas distribution assembly 120 may be a shower head, and may be a spatial atomic layer deposition (ALD) gas distribution assembly including parallel or substantially parallel gas channels. Here, the term "substantially parallel" may mean that elongate axes of the gas channels extend in the same direction. The gas channels may include at least one first reactive gas channel, at least one second reactive gas channel, at least one purge gas channel, and/or at least one vacuum channel. Gases flowing from the first reactive gas channel, the second reactive gas channel, and the purge gas channel are directed towards a top surface of the wafer, and a portion of the gas flow may move horizontally across the surface of the wafer and move out of a processing region through the purge gas channel. The substrate moving from one end of the gas distribution assembly 120 toward the other end may be sequentially exposed to each of process gases to form a layer on the surface thereof.

The susceptor assembly 140 may be positioned below the gas distribution assembly 120. The susceptor assembly 140 may include a top surface 141 and at least one recess 142 in the top surface 141. The susceptor assembly 140 may include a bottom surface 143 and an edge 144. The recess 142 may have any suitable shape and size, depending on a shape and size of the substrates 60 being processed. In some example embodiments illustrated in FIG. 1, the recess 142 has a flat bottom to support the bottom of the wafer, but the bottom of the recess 142 may vary. The recess 142 may be sized such that the substrate 60 supported in the recess 142 has a top surface 61 that is coplanar or substantially coplanar with the top surface 141 of the susceptor assembly 140.

The susceptor assembly 140 may include a support post 160 capable of lifting, lowering, and rotating the susceptor assembly 140. The susceptor assembly 140 may include a heater, gas lines, or electrical components within the center of the support post 160. The support post 160 may include fine tuning actuators 162 performing fine tuning on the susceptor assembly 140 to generate a particular (or, alternatively, predetermined) gap 170 between the susceptor assembly 140 and the gas distribution assembly 120.

Figure 2:
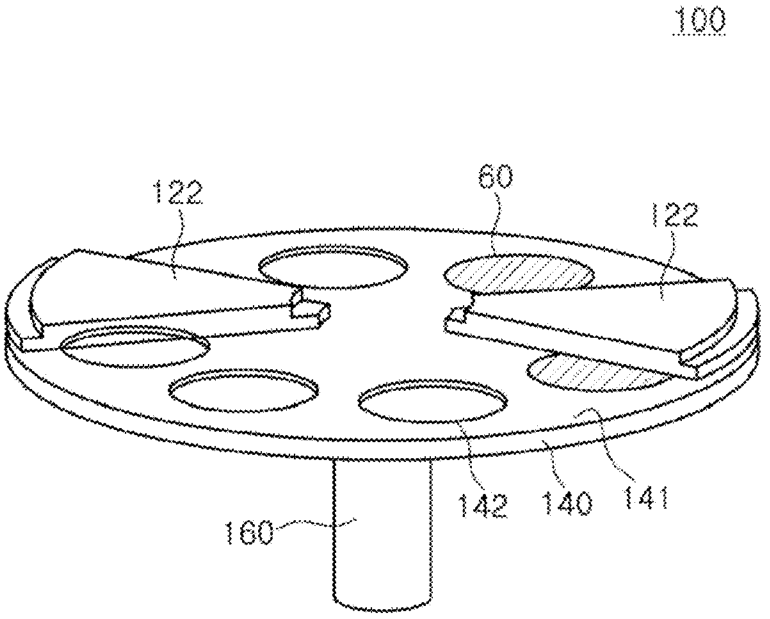
FIG. 2 is a schematic perspective view of a substrate processing system according to some example embodiments of the present inventive concepts.
Figure 3:
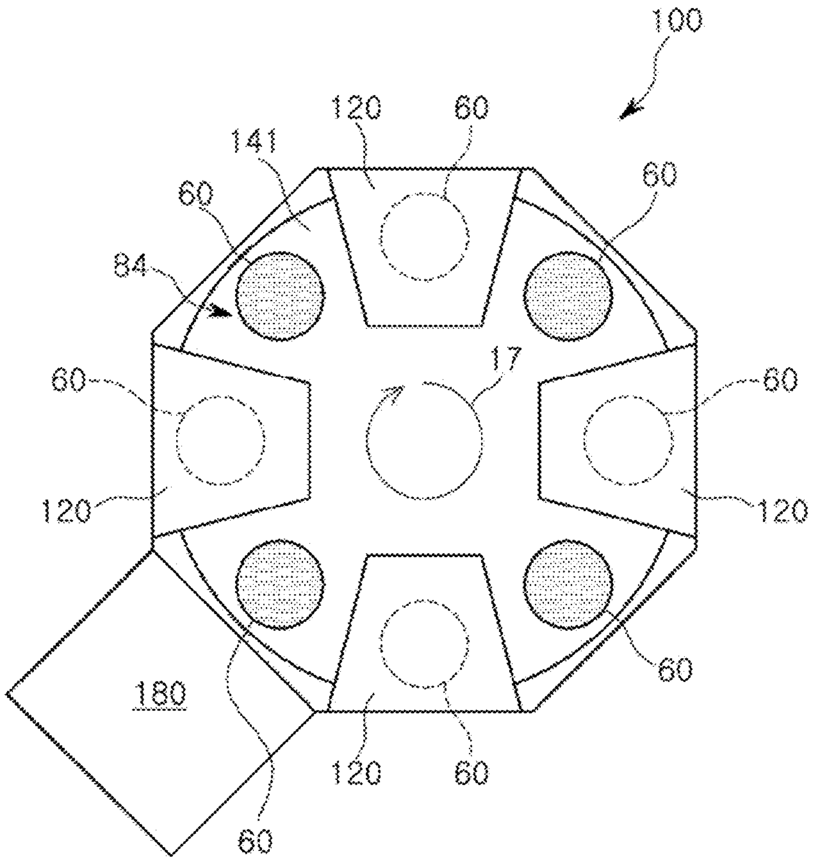
FIG. 3 is a plan view of a substrate processing system according to some example embodiments of the present inventive concepts.

FIG. 2 is a schematic perspective view of a substrate processing system according to some example embodiments of the present inventive concepts, and FIG. 3 is a plan view of a substrate processing system according to some example embodiments of the present inventive concepts.

Referring to FIG. 2, the substrate processing system 100 may be a carousel type in which the susceptor assembly 140 may hold a plurality of substrates 60. The gas distribution assembly 120 may include a plurality of injector units 122 (also referred to as injector devices). Each of the plurality of injector units 122 may deposit a film on the wafer as the wafer is moved below the injector unit. In some example embodiments, including the example embodiments illustrated in FIG. 2, two pie-shaped injector units 122 are illustrated as being positioned on the susceptor assembly 140 and on sides opposite to susceptor assembly 140, but the number of injector units 122 may be variously modified. For example, there may be a sufficient number of pie-shaped injector units 122 to form a shape consistent with the shape of the susceptor assembly 140. The pie-shaped injector units 122 may be moved, removed, and/or replaced independently without affecting each other. For example, one segment may be raised to allow a robot to access a region between the susceptor assembly 140 and the gas distribution assembly 120 to load or unload the substrates 60.

The substrate processing system 100 having multiple gas injectors may process multiple wafers simultaneously, such that the wafers go through the same process flow. As illustrated in FIG. 3, the substrate processing system 100 may include four gas distribution assemblies 120 (also referred to herein as gas injector assemblies) and four substrates 60. At the beginning of processing, the substrates 60 may be positioned between injector assemblies 120. When the susceptor assembly 140 is rotated by 45 degrees (marked by reference letter 17), the substrates 60 between the gas distribution assemblies 120 may be respectively moved to the gas distribution assemblies 120 for film deposition (the circle marked by the dashed line). Additionally, when the susceptor assembly 140 is rotated by 45 degrees, the substrates 60 may escape from the gas distribution assemblies 120. In the case of spatial ALD injectors, a film may be deposited on the wafer during movement of the wafer relative to the injector assembly. For example, the susceptor assembly 140 may be rotated in increments that prevent the substrates 60 from resting below the gas distribution assemblies 120. The number of substrates 60 and the number of gas distribution assemblies 120 may be equal to each other or different from each other, and the number of wafers being processed may be equal to the number of gas distribution assemblies. According to embodiments, the number of wafers being processed may be a fraction of the number of gas distribution assemblies or an integer multiple of the number of gas distribution assemblies. As an example, when there are four gas distribution assemblies, there may be 4× wafers being processed, and here, x may be an integer of 1 or greater.

In some example embodiments illustrated in FIG. 3, the substrate processing system 100 is octagonal and four gas distribution assemblies are equally spaced around the substrate processing system 100, but is not limited thereto. While the gas distribution assemblies illustrated in FIG. 3 are trapezoidal, the gas distribution assembly illustrated in FIG. 2 may be a plurality of pie-shaped segments or single circular components.

The substrate processing system 100 may include an auxiliary chamber such as a load-lock chamber 180 or a buffer station. The load-lock chamber 180 may be coupled to a side of the substrate processing system 100 to allow the substrates 60 to be loaded into or unloaded from the substrate processing system 100. A wafer robot may be positioned in the load-lock chamber 180 to move the substrate onto the susceptor assembly.

Rotation of the carousel (e.g., susceptor assembly 140) may be continuous or discontinuous. In continuous processing, the wafers are rotated constantly, so that the wafers may be exposed to each of the injectors in turn. In discontinuous processing, the wafers may be moved to and stopped in the injector region, and then moved to and stopped in a region 84 between the injectors. For example, the carousel may rotate such that the wafers move across the injector from an inter-injector region (or stop adjacent to the injector) and move to a next inter-injector region, and the carousel may pause again. Pause between injectors may provide time for additional processing steps (e.g., exposure to plasma) between each layer deposition.

Figure 4:
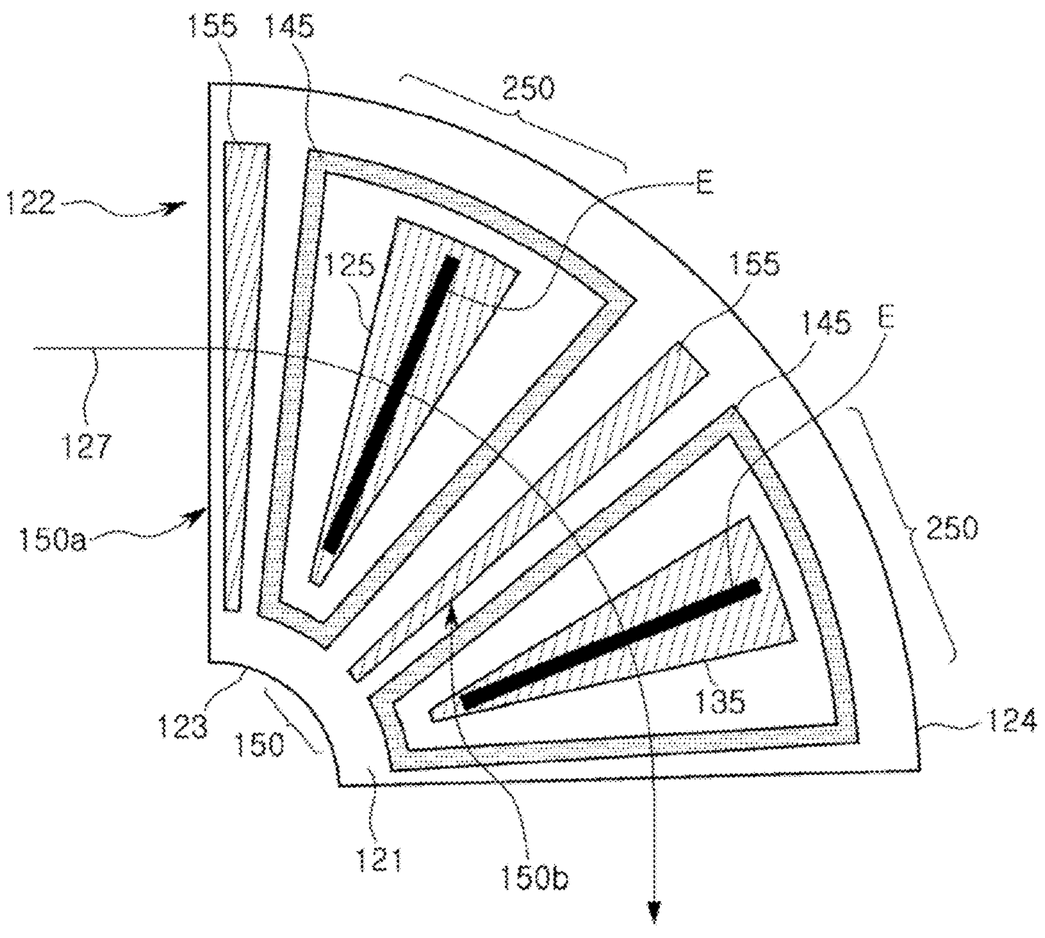
FIG. 4 is a view specifically illustrating a portion of a gas distribution assembly according to some example embodiments of the present inventive concepts.
Figure 5:
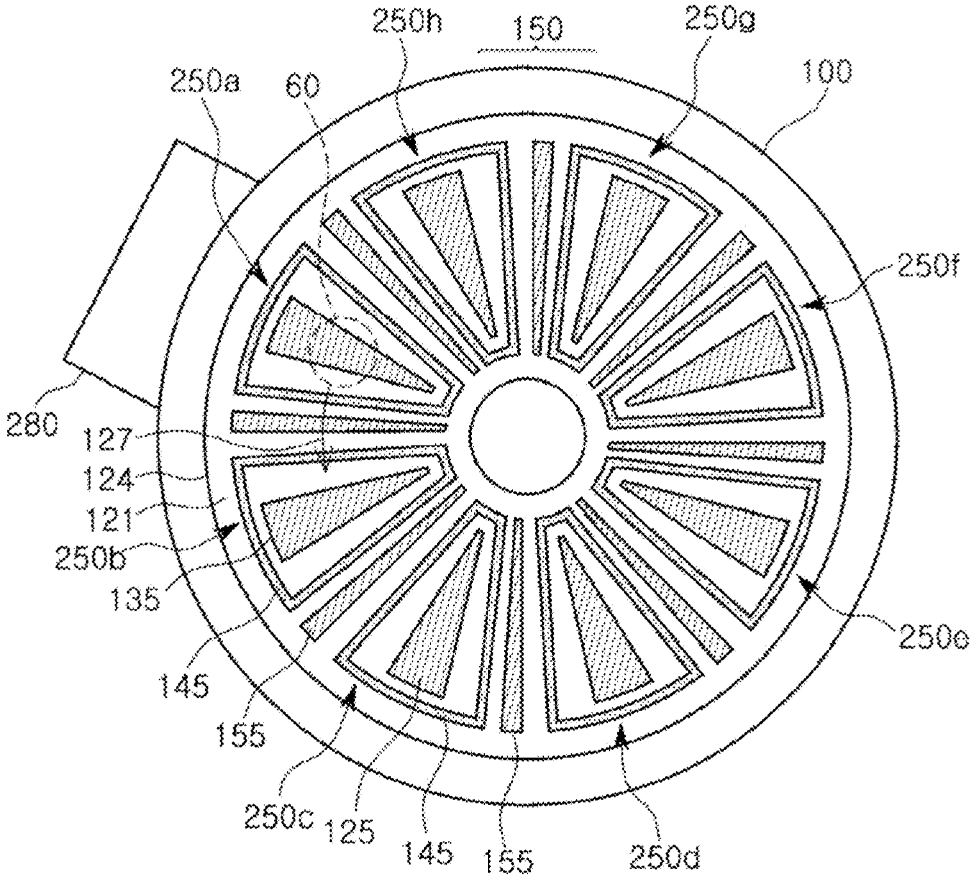
FIG. 5 is a diagram specifically illustrating a substrate processing system according to some example embodiments of the present inventive concepts.

FIG. 4 is a diagram specifically illustrating a portion of a gas distribution assembly according to some example embodiments of the present inventive concepts, and FIG. 5 is a diagram specifically illustrating a substrate processing system according to some example embodiments of the present inventive concepts.

FIG. 4 illustrates a sector or portion of a gas distribution assembly 120, which may also be referred to as the injector unit 122. The injector units may be used individually or in combination with other injector units. For example, as illustrated in FIG. 5, four injector units 122 of FIG. 4 may be combined to form a single gas distribution assembly 120. In FIG. 5, lines separating the four injector units are not illustrated for clarity. Although the injector unit 122 of FIG. 4 is illustrated as including both a first reactive gas port 125 and a second reactive gas port 135 in addition to purge gas ports 155 and vacuum ports 145, the injector unit 122 does not require all of these components. The vacuum port 145 may surround each of the first reactive gas port 125 and the second reactive gas port 135.

Referring to FIGS. 4 and 5 together, the gas distribution assembly 120 may include a plurality of sectors, that is, a plurality of injector units 122, each of which may be the same or different from each other. The gas distribution assembly 120 may be positioned within the substrate processing system 100 and may include a plurality of elongate gas ports 125, 135, and 145 on a front surface 121 of the gas distribution assembly 120. The plurality of elongate gas ports 125, 135, and 145 and purge gas ports 155 (also referred to as vacuum ports) may extend from a region adjacent to an inner circumferential edge 123 of the gas distribution assembly 120 toward a region adjacent to an outer circumferential edge 124, but is not limited thereto.

As the substrate moves along a path 127, each portion of the substrate surface may be exposed to various reactive gases. To follow the path 127, the substrate may be exposed to the purge gas port 155, vacuum port 145, first reactive gas port 125, vacuum port 145, purge gas port 155, vacuum port 145, the second reactive gas port 135, and the vacuum port 145. Thus, at the end of the path 127 illustrated in FIG. 4, the substrate may be exposed to gas streams from first reactive gas port 125 and second reactive gas port 135 to form a layer. The illustrated injector unit 122 forms a quarter circle, but may be larger or smaller. The gas distribution assembly 120 illustrated in FIG. 5 may be considered as a combination of four injector units 122 of FIG. 4 connected in series.

The injector unit 122 of FIG. 4 may include a gas curtain 150 separating the reactive gases. The term gas curtain may be used to describe any combination of gas flows or vacuum that separates reactive gases to keep the same from mixing. The gas curtain 150 illustrated in FIG. 4 may include a portion of the vacuum port 145 immediately next to the first reactive gas port 125, a purge gas port 155 in the middle, and a portion of the vacuum port 145 immediately next to the second reactive gas port 135. The combination of gas flows and vacuum may be used to reduce, prevent, or minimize gas phase reactions of the first and second reactive gases.

Referring to FIG. 5, the combination of gas flows and vacuum from the gas distribution assembly 120 may form a separation for a plurality of processing regions 250. The processing regions 250 are defined schematically around individual reactive gas ports 125 and 135 and the gas curtain 150 may be present between processing regions 250. In some example embodiments, including the example embodiments illustrated in FIG. 5, eight processing regions 250 and eight gas curtains 150 are illustrated therebetween, but the number of processing regions may be variously changed.

During processing, the substrate may be exposed to more than one processing region 250 at any given time. Portions exposed to different processing regions may have a gas curtain separating the two portions. For example, when a leading edge of the substrate enters the processing region including the second reactive gas port 135, a middle portion of the substrate may be below the gas curtain 150 and a trailing edge of the substrate may be within the processing region including the first reactive gas port 125.

A factory interface 280, which may be, for example, a load-lock chamber, is illustrated as being connected to the substrate processing system 100. The substrate 60 is illustrated as being superimposed over the gas distribution assembly 120 to provide a frame of reference. The substrate 60 may be placed on the susceptor assembly to be held near the front surface 121 of the gas distribution assembly 120. The substrate 60 may be loaded onto the substrate support or susceptor assembly into the substrate processing system 100 via the factory interface 280. The substrate 60 may be illustrated as being positioned within the processing region because the substrate is positioned near the first reactive gas port 125 and between the two gas curtains 150*a* and 150*b*. When the substrate 60 is rotated along the path 127, the substrate may be moved around the substrate processing system 100 counterclockwise. Accordingly, the substrate 60 may be exposed to a first processing region 250*a* to an eighth processing region 250*h* (including all processing regions therebetween). When the illustrated gas distribution assembly is used for each cycle around the substrate processing system, the substrate 60 may be exposed to four ALD cycles of the first reactive gas and the second reactive gas.

Referring back to FIG. 4, the substrate processing system 100 may include a plasma generator in each of the first reactive gas port 125 and the second reactive gas port 135. In FIG. 4, an RF electrode E of the plasma generator is illustrated. The plasma generator may generate plasma required for a semiconductor manufacturing process. The plasma causes a gas to react, and a thin film may be generated on the wafer using the gas activated by the plasma.

Figure 6:
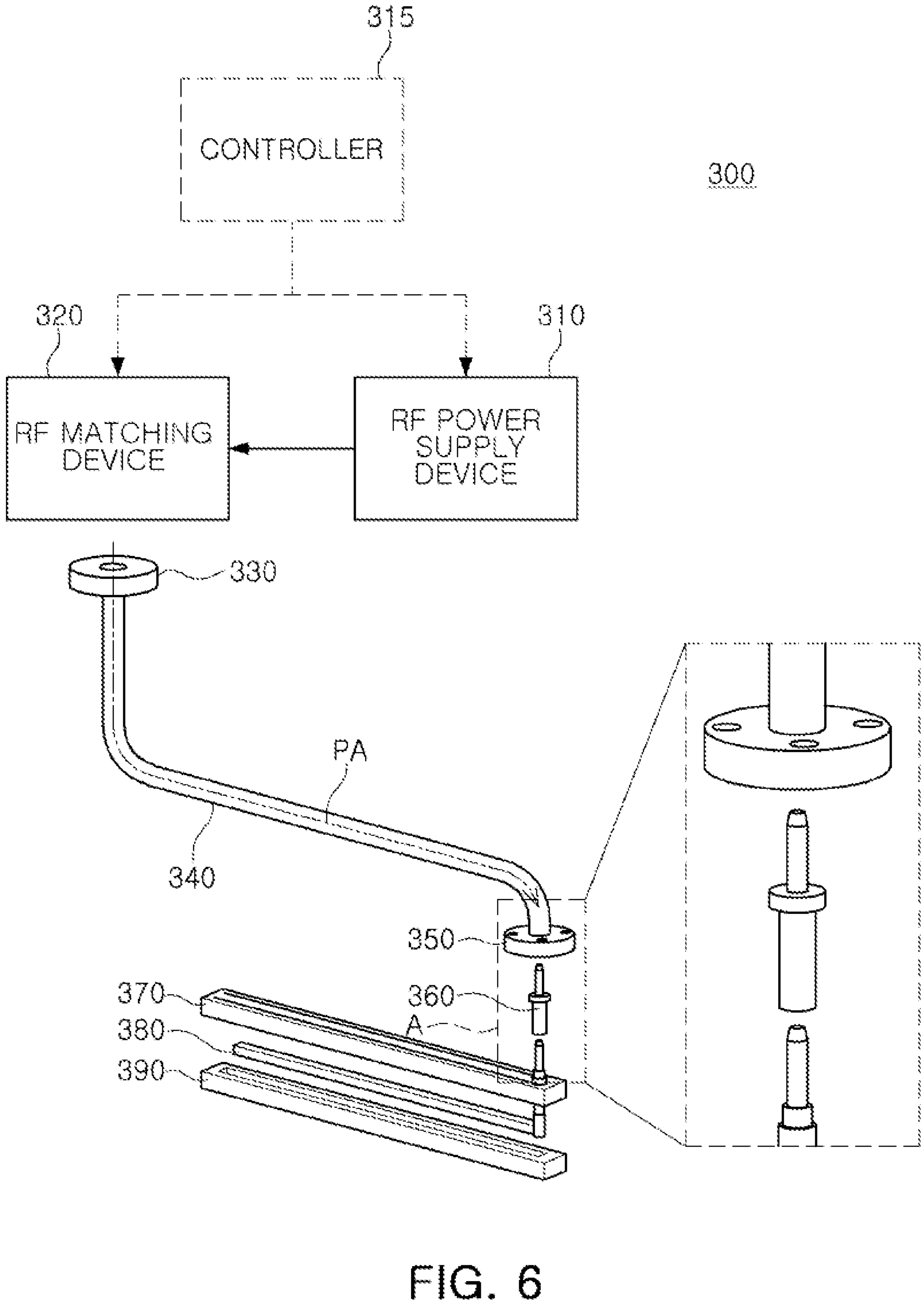
FIG. 6 is a view illustrating a general plasma generator according to some example embodiments of the present inventive concepts.

FIG. 6 is a view illustrating a general plasma generator according to some example embodiments of the present inventive concepts.

Referring to FIG. 6, the plasma generator 300 may include an RF power supply device 310 (also referred to as an RF power source), an RF matching device 320, an RF matching device connection portion 330 (also referred to as an RF matching device connector), a coaxial line 340, a coaxial tube assembly 350, a feed 360, a shower head 370, an RF electrode 380, and a quartz liner 390. RF power generated by the RF power supply device 310 may be applied to the RF electrode 380 through the RF matching device 320, the coaxial line 340, and the feed 360. The feed 360 may be positioned between the coaxial line 340 and the RF electrode 380. As shown, the feed 360 is a device that may include a protrusion at one end (e.g., a first end of the feed 360) and a recess at the other end (e.g., a second end that is an opposite end of the feed 360 in relation to the first end). The protrusion of the feed 360 may be coupled to, for example in physical contact (e.g., "contact," "direct contact," or the like) with, the coaxial line 340, and the recess of the feed 360 may be coupled to, for example in physical contact with, the RF electrode 380. Accordingly, the coaxial line 340, the feed 360, and the RF electrode 380 may be configured to establish (e.g., provide, form, etc.) an RF power transmission path PA, for example based on the feed 360 being coupled between the coaxial line 340 and the RF electrode 380 at respective opposite ends of the feed 360. A spring gasket may be positioned at a contact portion to improve contact characteristics. Electrodes on both sides (e.g., opposite sides) of the quartz liner 390 may serve as a ground, and an electric field may be formed from the RF electrode 380 to the electrodes on both sides. When gas is introduced into an empty space between the RF electrode 380 and the electrodes on both sides, plasma may be generated from the gas.

The RF power supply device 310 may generate RF power as a main power source for ionizing gas particles. A high frequency (radio frequency) may refer to a band of 13.56 MHz or higher. The RF matching device 320 may match output impedance of the RF power supply device 310 and input impedance of the process chamber to a constant value (e.g., 50Ω). This is to use power generated by the RF power supply device 310 to generate plasma as much as possible. The process chamber may include the RF electrode 380 and a quartz liner, and plasma may be generated in the process chamber.

The RF matching device connection portion 330, the coaxial line 340, the coaxial tube assembly 350, the feed 360, and the RF electrode 380 may form an RF power transmission path PA (e.g., a path via which RF power supplied from the RF power supply device 310 may propagate through the plasma generator 300 to reach at least the RF electrode 380. The RF matching device connection portion 330 may serve as a connector connecting the coaxial line 340 to the RF matching device 320, and the coaxial tube assembly 350 may serve as a connector connecting the coaxial line 340 to the feed 360. Accordingly, the coaxial tube assembly 350, the feed 360, and the RF electrode 380 may be configured to establish (e.g., provide, form, etc.) an RF power transmission path PA, for example based on the feed 360 being coupled between the coaxial tube assembly 350 and the RF electrode 380 at respective opposite ends of the feed 360. The feed 360 may be formed of an aluminum alloy and may be conducted (energized) between the coaxial line 340 and the RF electrode 380.

The RF electrode 380 may be connected to the coaxial line 340 through the feed 360.

Each of the RF matching device connection portion 330, the coaxial line 340, and the coaxial tube assembly 350 may include a first conductive metal, an insulator formed to surround the first conductive metal, and a second conductive metal formed to surround the insulator. The insulator may be plastic. The second conductive metal may serve as a ground, so that RF power may flow through the first conductive metal. The conductive metal may be an aluminum alloy.

The plasma generator 300 may include a controller 315 that may be configured to control one or more portions of the plasma generator 300, including for example the RF power supply device 310 and/or the RF matching device 320, to control (e.g., cause starting and stopping of) plasma generation by the plasma generator 300.

The controller 315 according to any of the example embodiments, and/or any portions thereof may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of the plasma generator 300, the RF power supply device 310, the RF matching device 320, and/or any portions thereof, including for example controlling generation of plasma by the plasma generator 300 based on controlling operation of the RF power supply device 310 and/or the RF matching device 320.

Figure 7:
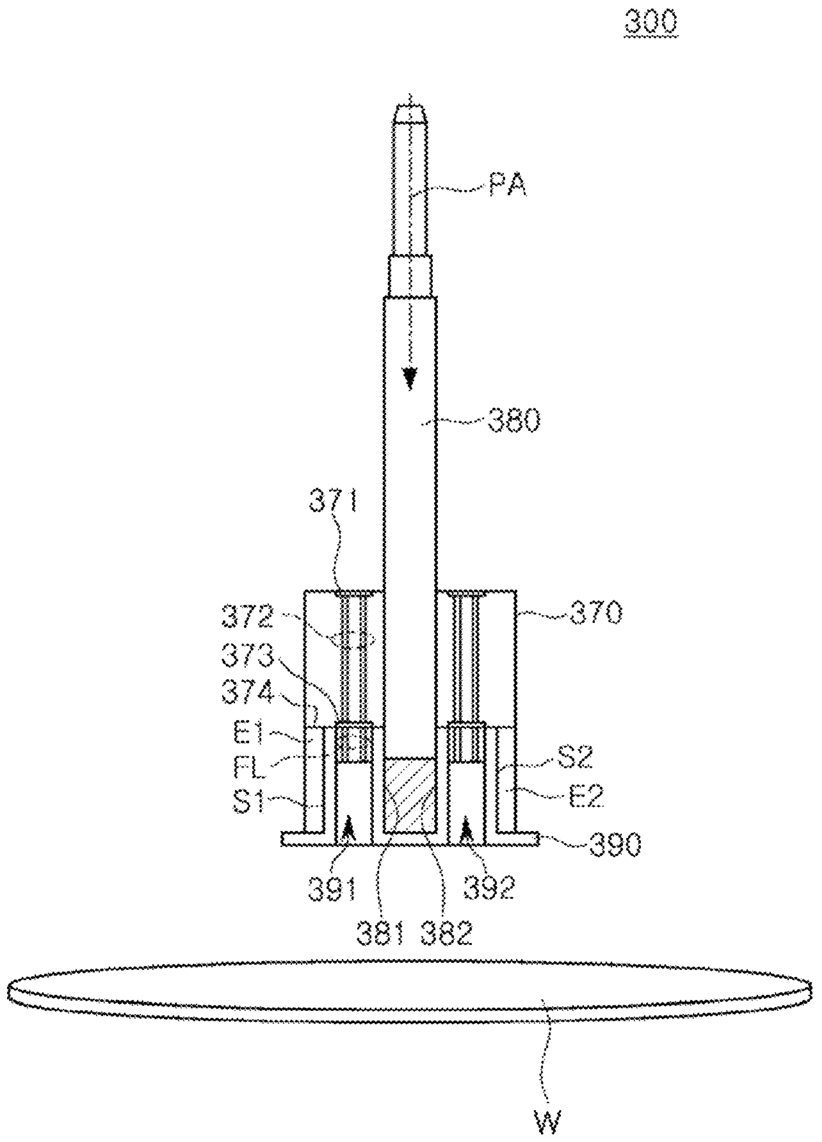
FIG. 7 is a cross-sectional view of a plasma generator according to some example embodiments of the present inventive concepts.

FIG. 7 is a cross-sectional view of a plasma generator according to some example embodiments of the present inventive concepts.

Referring to FIG. 7, the shower head 370 may be formed of an insulating material such as ceramic. The shower head 370 may supply gas to the plasma chamber. The shower head 370 may include a gas inlet 371 and a front surface 374. The gas inlet 371 allows the flow of gas to travel along a flow path FL through the shower head 370 and out of an opening 373 on the front surface 374. The shower head 370 may be a dielectric having a plurality of through-holes and/or plenums 372 to increase uniformity of the gas flow through the flow path FL. The plurality of through-holes and/or plenums may have dimensions small enough to reduce occurrence of, or prevent, plasma breakdown.

The quartz liner 390 may be glass including $SiO_2$. The plasma generator 300 may include a first electrode E1 and a second electrode E2 on both sides of the quartz liner 390. The first electrode E1 and the second electrode E2 may have any suitable electrical characteristics, and may be, for example, a ground electrode. The ground electrode may be any conductive material in electrical contact with an electrical ground. For example, the first electrode E1 and the second electrode E2 may include, but are not limited to, aluminum, stainless steel, and copper. The first electrode E1 and the second electrode E2 may form a complete circuit together with the RF electrode 380 to provide a path for electrons to flow. The RF electrode 380 may include a first surface 381 and an opposite second surface 382 oriented parallel or substantially parallel to the flow path. The first electrode E1 may include a first surface S1 oriented parallel or substantially parallel to the flow path FL. The first surface S1 of the first electrode E1 may be spaced apart from the first surface 381 of the RF electrode 380 to form a gap 391. The second electrode E2 may include a first surface S2 oriented parallel or substantially parallel to the flow path FL. The first surface S2 of the second electrode E2 may be spaced apart from the second surface 382 of the RF electrode 380 to form a gap 392.

The first electrode E1 and the second electrode E2 may serve as a ground, and an electric field may be formed from the RF electrode 380 to the first electrode E1 and the second electrode E2. When gas flows into the gap 391 between the RF electrode 380 and the first electrode E1 and the gap 392 between the RF electrode 380 and the second electrode E2, plasma may be generated from the gas. The gaps 391 and 392 may be plasma generating regions.

A wafer W may exist below the plasma generator 300, and the generated plasma may be used to generate a thin film on the wafer W.

Figure 8:
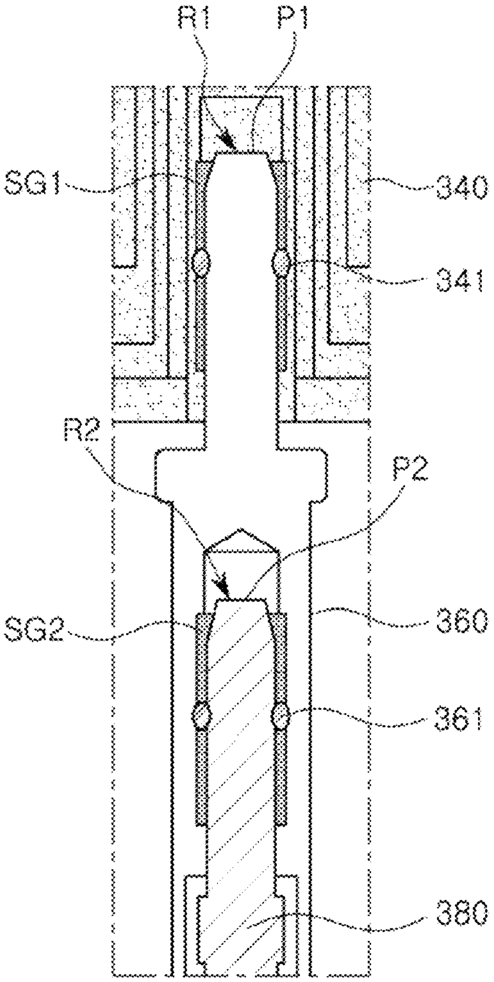
FIGS. 8 and 9 illustrate comparative examples for explaining a plasma generator according to some example embodiments of the present inventive concepts.
Figure 9:
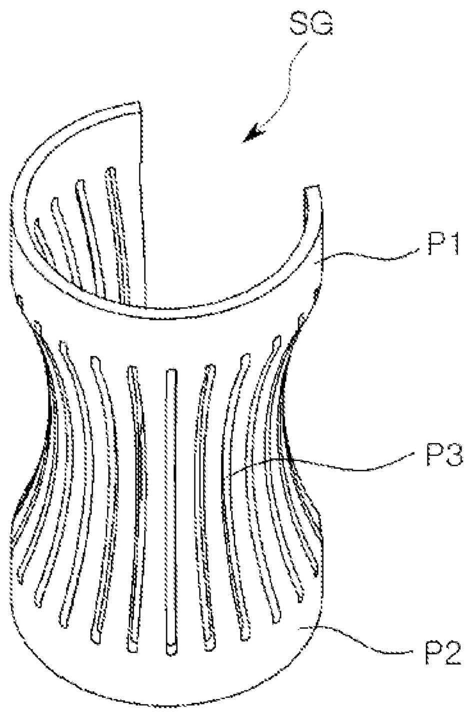

FIGS. 8 and 9 are comparative examples for explaining a plasma generator according to some example embodiments of the present inventive concepts.

Referring to FIG. 8, the coaxial line 340 may include a first recess R1 at one end thereof. The feed 360 may include a first protrusion P1 at one end and a second recess R2 at the other end. The RF electrode 380 may include a second protrusion P2 at one end.

The first recess R1 of the coaxial line 340 and the first protrusion P1 of the feed 360 may be coupled to each other, and the second recess R2 of the feed 360 and the second protrusions P2 of the RF electrode 380 may be coupled to each other. A first insertion groove may be formed on an inner circumferential surface of one end of the coaxial line 340, and a first spring gasket SG1 may be inserted into the first insertion groove. A second insertion groove may be formed on an inner circumferential surface of the other end of the feed 360, and a second spring gasket SG2 may be inserted into the second insertion groove. The spring gaskets SG1 and SG2; SG may be in the form of a cylindrical leaf spring formed of metal as illustrated in FIG. 9. The spring gasket SG may include an upper end portion P1 having a circular stripe shape, a lower end portion P2 having a circular stripe shape, and a central portion P3 between the upper end portion P1 and the lower end portion P2. The central portion P3 may include slits formed in a longitudinal direction.

Referring back to FIG. 8, the first protrusion P1 of the feed 360 may be inserted into the first spring gasket SG1 inserted into the coaxial line 340. The first spring gasket SG1 may surround the first protrusion P1 of the feed 360. Accordingly, the first protrusion P1 of the feed 360 may contact the central portion P3 of the first spring gasket SG1 to form a first contact point 341. At the first contact point 341 of the feed 360 and the coaxial line 340, the first spring gasket SG1 may apply an elastic force to the feed 360 in a direction toward the coaxial line 340 from the feed 360. Accordingly, the first spring gasket SG1 may support the feed 360 at the first contact point 341.

The second protrusion P2 of the RF electrode 380 may be inserted into the second spring gasket SG2 inserted in the feed 360. The second spring gasket SG2 may surround the second protrusion of the RF electrode 380. Accordingly, the second protrusion of the RF electrode 380 may contact the central portion P3 of the second spring gasket SG2 to form a second contact point 361. At the second contact point 361 of the feed 360 and the RF electrode 380, the second spring gasket SG2 may apply an elastic force to the RF electrode 380 in the direction from the RF electrode 380 to the feed 360. Accordingly, the second spring gasket SG2 may support the RF electrode 380 at the second contact point 361. An RF power transmission path may be formed by metal-to-metal contact at the first contact point 341 and the second contact point 361.

The use of the spring gasket may improve contact characteristics (e.g., contact area, evenness of contact area, etc.) between dissimilar components. In other words, physical contact (e.g., contact area) between the protrusion of the feed 360 and the coaxial line 340 and physical contact characteristics of the recess of the feed 360 and the RF electrode 380 may be improved. In addition, the feed 360 and the RF electrode 380 may be supported using the elasticity of the spring gasket, and the spring gasket may be easily replaced because the spring gasket is in the form of a leaf spring.

However, contact resistance of the contact area may increase due to a shape and number (e.g., quantity) of the spring gasket. An increase in the contact resistance may melt or carbonize the contact area. In addition, central axes of the dissimilar components may not be aligned and may deviate to one side. Due to such an unstable fastening structure, current may not be evenly transmitted in all directions of the contact area, and current may flow intensively in a specific direction. Therefore, heat may occur (e.g., may be generated) in a portion through which the current flows intensively to melt. In addition, unstable plasma may occur to affect process quality.

According to some example embodiments of the present inventive concepts, the contact force may be increased by changing the shape of the energizing medium (e.g., conductive medium) used for the contact area between dissimilar components existing in the RF power transmission path. By increasing the contact force, contact resistance of the contact area may be reduced. In addition, melting of the contact area may be reduced or prevented by forming a solid fastening structure by increasing the number of the energizing medium. In addition, deterioration of the process quality may be reduced or prevented by stably generating plasma.

Figure 10:
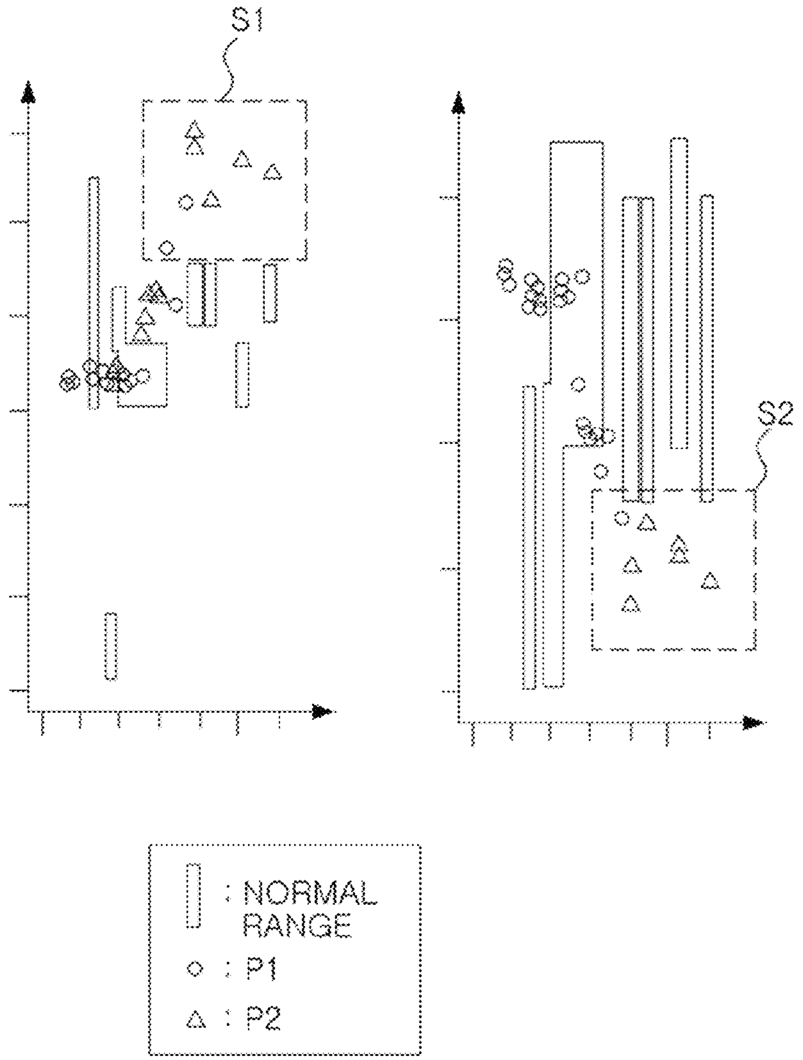
FIG. 10 is a graph illustrating data for evaluating process quality according to a comparative example of the present inventive concepts.

FIG. 10 is a graph illustrating data for evaluating process quality according to a comparative example of the present inventive concepts.

Referring to FIG. 10, the x-axis represents time and the y-axis represents a position of a component for good impedance matching within the RF matching device.

Components in the RF matching device may be continuously repositioned to achieve good impedance matching. A position of the component in the RF matching device may vary within the normal range P1. However, if the RF power transmission path deteriorates, the contact may change at the contact point between dissimilar components. Accordingly, the position of the component in the RF matching device may deviate from the normal range. If the position of the component in the RF matching device is out of the normal range, it may mean that an environment of a process chamber generating plasma is constantly changing. In addition, 100% of the RF power cannot be used to generate plasma, and reflected power may increase to degrade power transfer efficiency. A first region S1 and a second region S2 indicate a case P2 in which the position of the component in the RF matching device is out of the normal range.

Figure 11:
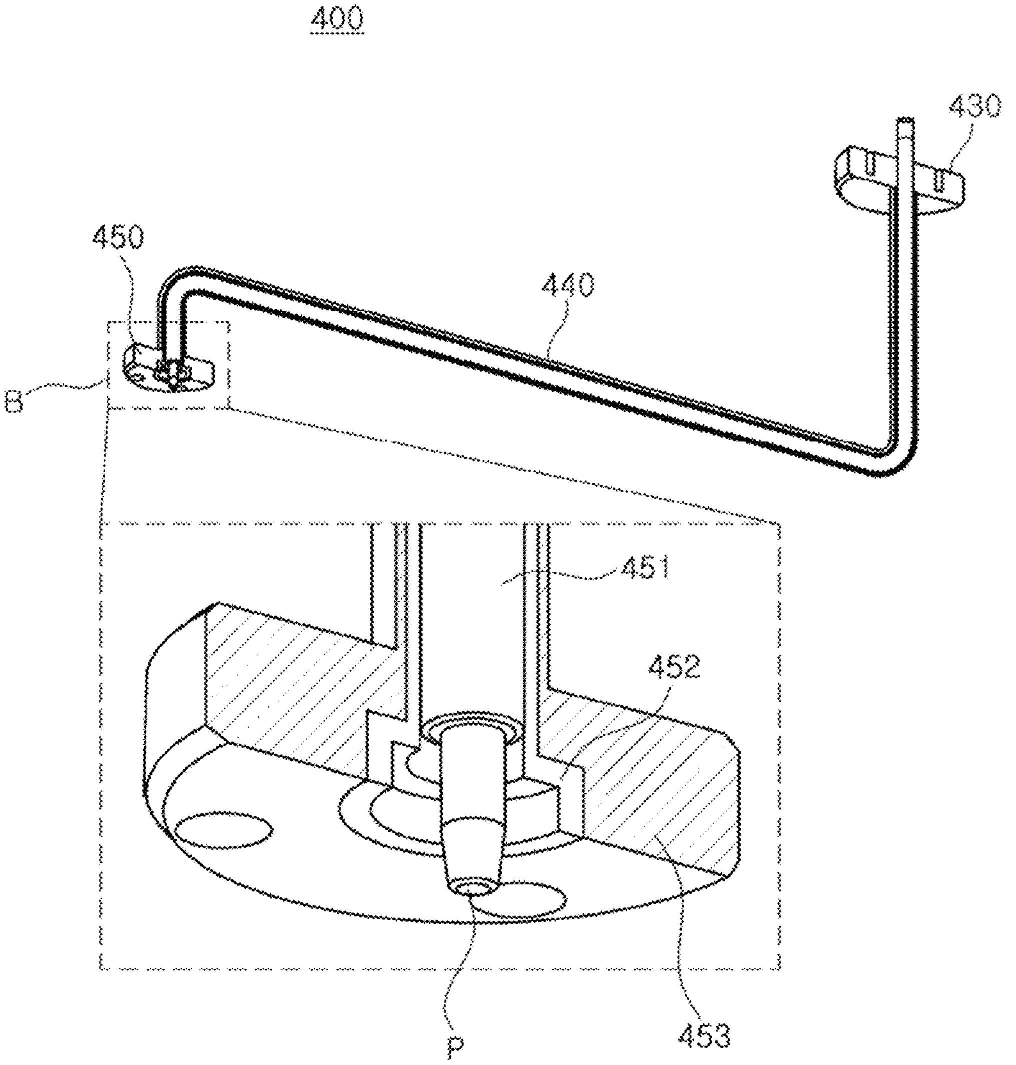
FIG. 11 is a view illustrating a coaxial tube assembly according to some example embodiments of the present inventive concepts.

FIG. 11 is a view illustrating a coaxial tube assembly according to some example embodiments of the present inventive concepts.

Referring to FIG. 11, the plasma generator 400 includes an RF matching device connection portion 430 (also referred to as an RF matching device connector), a coaxial line 440, and a coaxial tube assembly 450. Referring to FIG. 11, the coaxial tube assembly 450 includes a first conductive metal 451, an insulator 452 formed to surround the first conductive metal 451, and a second conductive metal 453 formed to surround the insulator 452. The insulator 452 may be plastic. The second conductive metal 453 may serve as a ground, so that RF power may flow through the first conductive metal 451. The conductive metal may be an aluminum alloy. One end of the first conductive metal 451 (e.g., one end of the coaxial tube assembly 450) may include a protrusion P. The protrusion P of the first conductive metal 451 at the one end of the coaxial tube assembly 450) may be inserted into a recess of the feed of the plasma generator (e.g., feed 460 shown in FIG. 12), so that the coaxial line 440, the feed, and the RF electrode may form (e.g., at least partially define, establish, etc.) an RF power transmission path via which RF power may propagate from an RF power supply to an RF electrode when the plasma generator is being operated.

Figure 12:
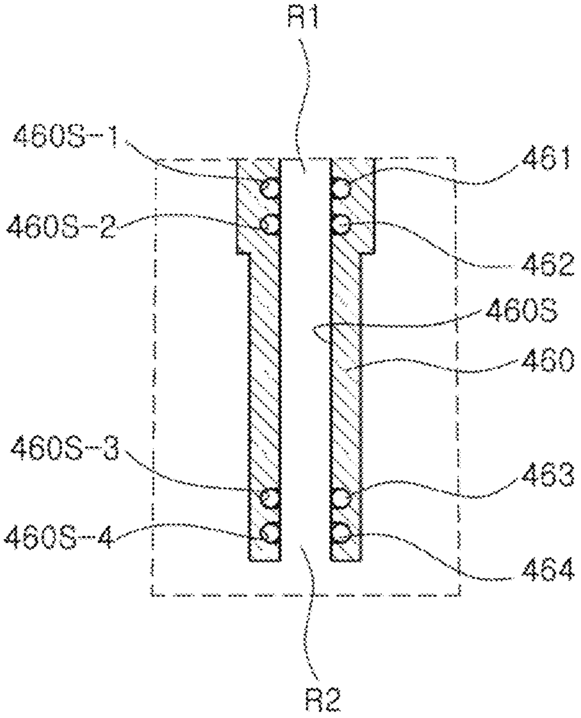
FIG. 12 is a view schematically illustrating a feed according to some example embodiments of the present inventive concepts.

FIG. 12 is a view schematically illustrating a feed according to some example embodiments of the present inventive concepts.

Referring to FIG. 12, a feed 460 may include a first recess R1 at one end (e.g., a first end of the feed 460) and a second recess R2 at the other end (e.g., a second end of the feed 460 that is an opposite end of the feed 460 in relation to the first end of the feed 460). Restated, the feed 460 may include an inner circumferential surface 460S that defines the first and second recesses R1 and R2 at opposite ends of the feed 460. Circular insertion grooves 461 and 462, also referred to herein interchangeably as simply "insertion grooves," may be formed in an inner circumferential surface 460S of one end (e.g., the first end) of the feed 460. Restated, the feed 460 may include one or more first inner surfaces (e.g., inner surfaces 460S-1 and 460S-2) that define separate, respective insertion grooves 461 and 462 in the inner circumferential surface 460S at the first end of the feed 460. A circular coil spring (e.g., a first circular coil spring) may be inserted into the insertion grooves 461 and 462. Restated, the first circular coil spring may be at least partially (e.g., partially or entirely) within at least one of the insertion grooves 461 or 462. In some example embodiments, separate first circular coil springs may be at least partially within separate, respective insertion grooves 461 and 462. Circular insertion grooves 463 and 464 (also referred to herein as "insertion grooves") may be formed on an inner circumferential surface of the other end of the feed 460. Restated, the feed 460 may include one or more second inner surfaces (e.g., inner surfaces 460S-3 and 460S-4) that define separate, respective insertion grooves 463 and 464 in the inner circumferential surface 460S at the second end of the feed 460. A circular coil spring (e.g., a second circular coil spring) may be inserted into the insertion grooves 463 and 464. Restated, the second circular coil spring may be at least partially within at least one of the insertion grooves 463 or 464. In some example embodiments, separate second circular coil springs may be at least partially (e.g., partially or entirely) within separate, respective insertion grooves 463 and 464. As shown, in FIG. 12 and as further shown in FIG. 13, the first and second circular coil springs (e.g., S1 to S4 in FIG. 13) may be located entirely within respective insertion grooves 461 to 464 such that the circular coil springs are located outside a cylindrical volume space that is defined by the inner circumferential surface 460S of the feed 460. Restated, each circular coil spring (e.g., S1 to S4) that is at least partially within a respective insertion groove (e.g., 461 to 464) may be located at least partially (e.g., partly or entirely) within an annular volume space that is defined by inner surfaces of the respective insertion groove and which extends around the cylindrical volume space that is defined by the inner circumferential surface 460S. While the coil springs are described as "circular" coil springs, it will be understood that the coil springs inserted into the separate, respective insertion grooves 461 to 464 may be different from circular coil springs, for example may be coil springs having a cross-section having a non-circular shape (e.g., a polygonal shape). In FIG. 12, it is illustrated that two insertion grooves 461 and 462 are formed at one end of the feed 460 and two insertion grooves 463 and 464 are formed at the other end of the feed 460, but the number (e.g., quantity) of insertion grooves may be variously modified. For example, in some example embodiments, insertion grooves 462 and 463 may be absent from feed 460, such that only one "first" insertion groove 461 is present at the first end of the feed 460 and only one "second" insertion groove 464 is present at the second end of the feed 460.

Figure 13:
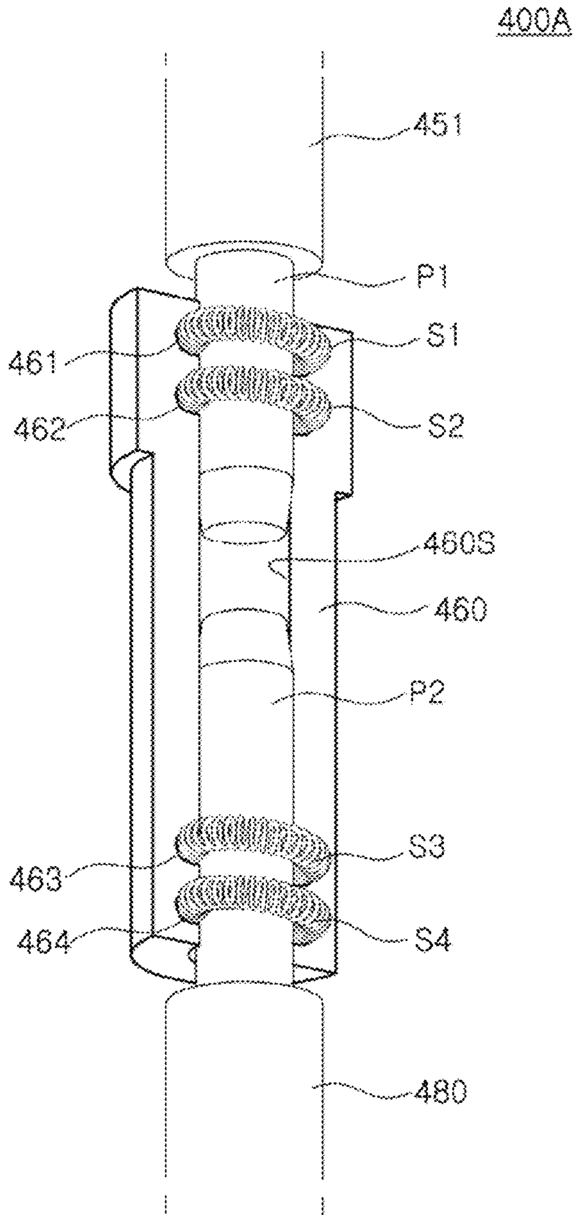
FIG. 13 is a schematic perspective view of a plasma generator according to some example embodiments of the present inventive concepts.
Figure 14:
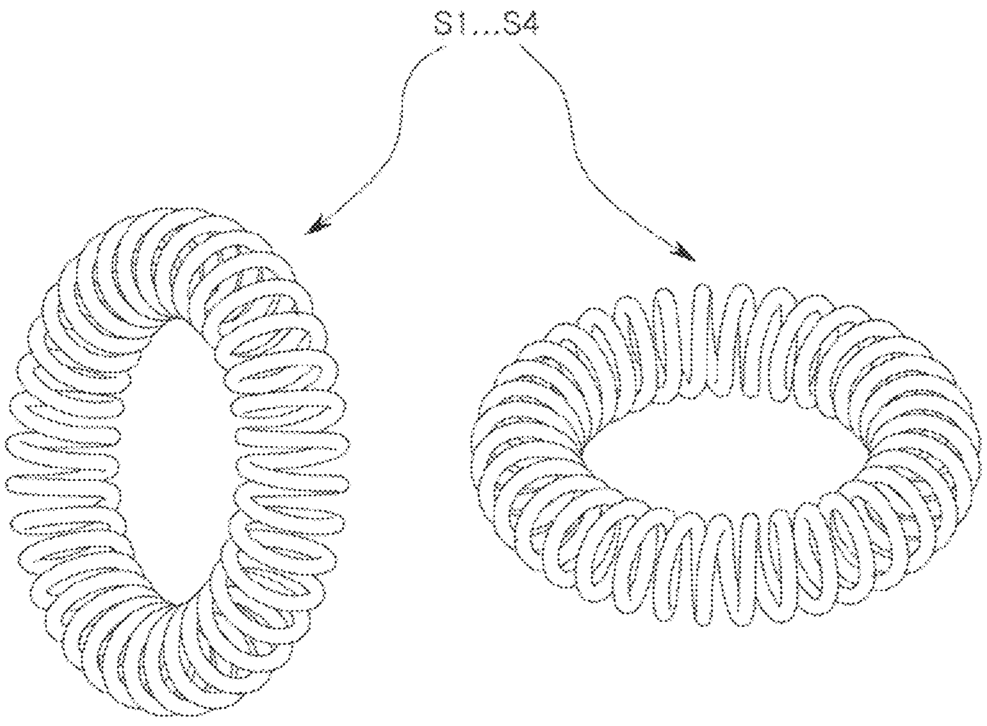
FIG. 14 is a view illustrating a circular coil spring according to some example embodiments of the present inventive concepts.

FIG. 13 is a schematic perspective view of a plasma generator 400A according to some example embodiments of the present inventive concepts, and FIG. 14 is a view illustrating a circular coil spring according to some example embodiments of the present inventive concepts.

Referring to FIG. 13, a first coil spring S1 may be inserted into (e.g., may be at least partially or entirely within) the first insertion groove 461 formed at one end of the feed 460, and a second coil spring S2 may be inserted into (e.g., may be at least partially or entirely within) the second insertion groove 462 formed at one end of the feed 460. A third coil spring S3 may be inserted into (e.g., may be at least partially or entirely within) a third insertion groove 463 formed at the other end of the feed 460, and a fourth coil spring S4 may be inserted into (e.g., may be at least partially or entirely within) a fourth insertion groove 464 formed at the other end of the feed 460. Each coil spring may be partially within a respective insertion groove, such that a portion of the coil spring may protrude from the inner circumferential surface 460S of the feed 460 by a particular (or, alternatively, predetermined) length. A diameter of an insertion groove may be greater than a diameter of a cross-section of the coil spring that is at least partially located within the insertion groove. Accordingly, the coil spring may be easily mounted.

The first protrusion P1 of the first conductive metal 451 may be inserted into the first coil spring S1 and the second coil spring S2 inserted in the feed 460. The first coil spring S1 and the second coil spring S2 may apply an elastic force to the first conductive metal 451 in a direction from the feed 460 to the first conductive metal 451. Accordingly, the first coil spring S1 and the second coil spring S2 may support the first conductive metal 451. As shown in FIG. 13, an inner circumferential surface of each of the first coil spring S1 and the second coil spring S2 may be in contact with the first protrusion P1 of the first conductive metal 451, and an outer circumferential surface of each of the first coil spring S1 and the second coil spring S2 may be in contact with each of the first insertion groove 461 and the second insertion groove 462 of the feed 460. Contact points may be formed at a contact area.

The second protrusion P2 of the RF electrode 480 may be inserted into the third coil spring S3 and the fourth coil spring S4 inserted in the feed 460. The third coil spring S3 and the fourth coil spring S4 may apply an elastic force to the RF electrode 480 in a direction from the feed 460 to the RF electrode 480. Accordingly, the third coil spring S3 and the fourth coil spring S4 may support the RF electrode 480. As shown in FIG. 13, an inner circumferential surface of each of the third coil spring S3 and the fourth coil spring S4 may be in contact with the second protrusion P2 of the RF electrode 480, and an outer circumferential surface of each of the third coil spring S3 and the fourth coil spring S4 may be in contact with each of the third insertion groove 463 and the fourth insertion groove 464 of the feed 460. Contact points may be formed at a contact area.

An RF power transmission path may be formed by metal-to-metal contact at the contact points. Among the first to fourth coil springs S1 to S4, the fourth coil spring S4 may be adjacent to a region in which plasma is generated. Restated, the feed 460 may be configured to be positioned in the plasma generator such that the insertion groove 464 (e.g., a second insertion groove) may be adjacent to a region of the plasma generator in which the plasma generator is configured to generate plasma. For example, the insertion groove 464 may be configured to be proximate to and/or adjacent to the RF electrode 480 when the feed 460 is coupled to the RF electrode 480. It will be understood that one or more of the coil springs S1 to S4 inserted into the separate, respective insertion grooves 461 to 464 may be circular coil springs or may be different from circular coil springs, for example may be coil springs having a cross-section having a non-circular shape (e.g., a polygonal shape).

Referring to FIG. 14, the cross-section of the coil spring may have a circular shape. The coil spring may include at least one selected from the group consisting of aluminum (Al), nickel (Ni), copper (Cu), iron (Fe), titanium (Ti), and iridium (Ir). For example, the coil spring may include at least one of aluminum (Al), nickel (Ni), copper (Cu), iron (Fe), titanium (Ti), or iridium (Ir). Although a general circular spring having a circular cross-section is illustrated, the cross-sectional shape of the coil spring may be polygonal. In the case of the spring gasket in the form of a leaf spring illustrated in FIG. 9, the contact area may be in the form of a long plate. In the case of the circular coil spring illustrated in FIG. 14, the contact portion may have a circular shape. Therefore, the contact force of the circular coil spring illustrated in FIG. 14 may be greater than that of the leaf spring type spring gasket illustrated in FIG. 9. When the contact force of the contact portion increases, contact resistance of the contact portion may decrease. Therefore, the use of the circular coil spring illustrated in FIG. 14 may alleviate the problem of melting or carbonization of the contact area.

Referring back to FIG. 13, two coil springs may be inserted into each of both ends of the feed 460. Accordingly, the central axes of the dissimilar components may be aligned, and current may be uniformly transmitted in all directions of the contact area. Since current is reduced or prevented from flowing intensively in a specific direction of the contact area, the problem of melting or carbonization of the contact area may be alleviated. In addition, deterioration of process quality may be reduced or prevented by stably generating plasma.

When both ends of the feed 460 are manufactured with recesses, manufacturing easiness may be increased and cost and risk may be reduced. In other words, characteristics of a SiN film quality as a result of the process may be the same despite the improvement of the component. For example, after component improvement, the thickness of the film, the reflective index of the film, film stress, and wet etch rate (WER) may be the same as those before the component improvement.

In FIG. 13, some example embodiments in which both ends of the feed 460 are recessed is illustrated, but both ends of the feed 460 may be changed to have various shapes.

Figure 15:
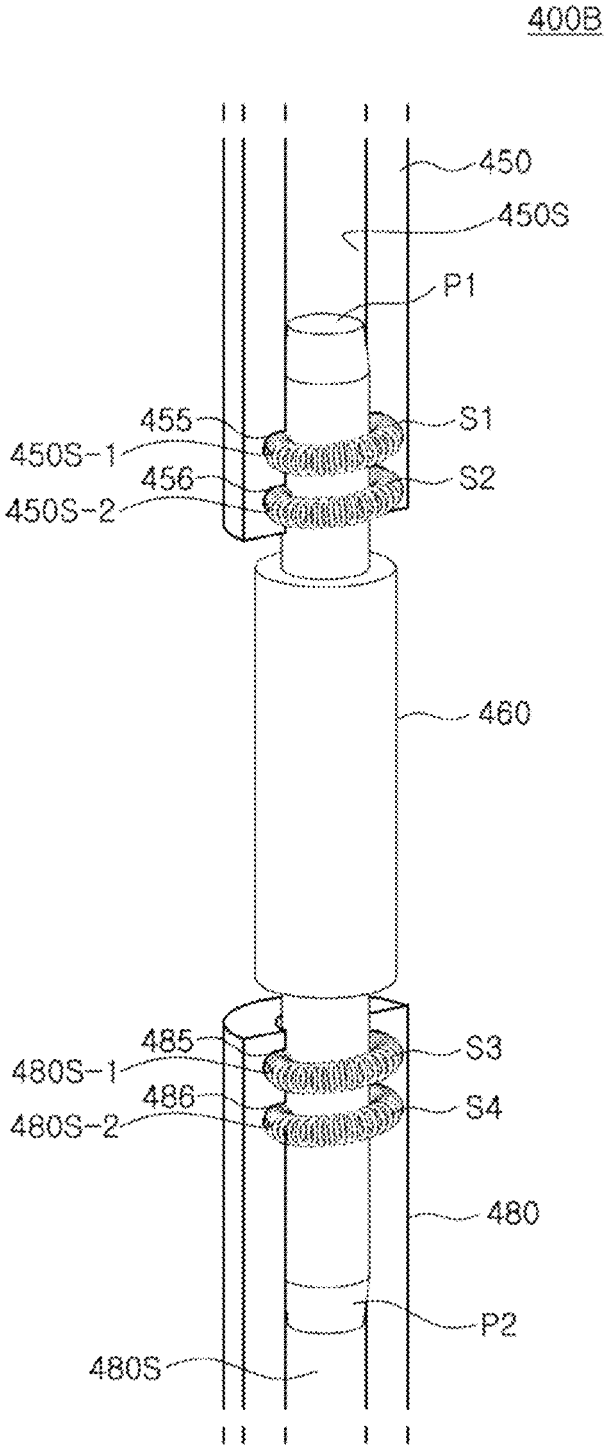
FIG. 15 is a schematic perspective view of a plasma generator according to some example embodiments of the present inventive concepts.

FIG. 15 is a schematic perspective view of a plasma generator according to some example embodiments of the present inventive concepts.

Referring to FIG. 15, the plasma generator 400B may include a coaxial tube assembly 450, a feed 460, and an RF electrode 480. The feed 460 may include a first protrusion P1 at one end and a second protrusion P2 at the other end. One end of the coaxial tube assembly 450 may include a first recess. For example, as shown in FIG. 15, the coaxial tube assembly 450 may include a first inner circumferential surface 450S that defines a first recess at one end of the coaxial tube assembly 450. The coaxial tube assembly 450 may include a first conductive metal, an insulator formed to surround the first conductive metal, and a second conductive metal formed to surround the insulator, as described above. The first recess of the coaxial tube assembly 450 may be formed at one end of the first conductive metal. One end of the RF electrode 480 may include a second recess. For example, as shown in FIG. 15, the RF electrode 480 may include a second inner circumferential surface 480S that defines a second recess at one end of the RF electrode 480.

Circular insertion grooves 455 and 456 may be formed on an inner circumferential surface 450S of one end of the coaxial tube assembly 450. For example, as shown in FIG. 15, the coaxial tube assembly 450 may include first inner surfaces 450S-1 and 450S-2 that define separate, respective insertion groove 455 and 456 in the first inner circumferential surface 450S at the one end of the coaxial tube assembly 450. A circular coil spring may be inserted into (e.g., at least partially within) the insertion grooves 455 and 456. Circular insertion grooves 485 and 486 may be formed on an inner circumferential surface of one end of the RF electrode 380. For example, as shown in FIG. 15, the RF electrode 480 may include second inner surfaces 480-S1 and 480S-2 that define separate, respective insertion grooves 485 and 486 in the second inner circumferential surface 480S at the one end of the RF electrode 480. A circular coil spring may be inserted into (e.g., at least partially within) the insertion grooves 485 and 486. In FIG. 15, it is illustrated that two insertion grooves 455 and 456 are formed at one end of the coaxial tube assembly 450 and two insertion grooves 485 and 486 are formed at one end of the RF electrode 480, but the number of the insertion grooves may be variously modified. For example, in some example embodiments, insertion grooves 455 and 486 may be absent from the coaxial tube assembly 450 and the RF electrode 480, respectively, such that only one "first" insertion groove 456 is present at the one end of the coaxial tube assembly 450 and only one "second" insertion groove 464 is present at the one end of the RF electrode 480. While the coil springs S1 to S4 are described as "circular" coil springs, it will be understood that the coil springs inserted into the separate, respective insertion grooves 455, 456, 485, 486 may be different from circular coil springs, for example may be coil springs having a cross-section having a non-circular shape (e.g., a polygonal shape).

The first coil spring S1 may be inserted into the first insertion groove 455 formed at one end of the coaxial tube assembly 450, and the second coil spring S2 may be inserted into the second insertion groove 456 formed at one end of the coaxial tube assembly 450. The third coil spring S3 may be inserted into the third insertion groove 485 formed at one end of the RF electrode 480, and the fourth coil spring S4 may be inserted into the fourth insertion groove 486 formed at one end of the RF electrode 380. A portion of the coil spring may protrude from the inner circumferential surface of the feed 460 by a particular (or, alternatively, predetermined) length. A diameter of the insertion groove may be greater than a diameter of a cross-section of the coil spring. Accordingly, the coil spring may be easily mounted.

The first protrusion P1 of the feed 460 may be inserted into the first coil spring S1 and the second coil spring S2 inserted in the coaxial tube assembly 450. The first coil spring S1 and the second coil spring S2 may apply an elastic force to the feed 460 in a direction from the coaxial tube assembly 450 to the feed 460. Accordingly, the first coil spring S1 and the second coil spring S2 may support the feed 460. An inner circumferential surface of each of the first coil spring S1 and the second coil spring S2 may be in contact with the first protrusion P1 of the feed 460, and an outer circumferential surface of each of the first coil spring S1 and the second coil spring S2 may be in contact with each of the first insertion groove 455 and the second insertion groove 456 of the coaxial tube assembly 450. Contact points may be formed at the contact area.

The second protrusion P2 of the feed 460 may be inserted into the third coil spring S3 and the fourth coil spring S4 inserted in the RF electrode 480. The third coil spring S3 and the fourth coil spring S4 may apply an elastic force to the feed 460 in a direction from the RF electrode 480 to the feed 460. Accordingly, the third coil spring S3 and the fourth coil spring S4 may support the feed 460. An inner circumferential surface of the third coil spring S3 and the fourth coil spring S4 may be in contact with the second protrusion P2 of the feed 460, and an outer circumferential surface of the third coil spring S3 and the fourth coil spring S4 may be in contact with each of the third insertion groove 463 and the fourth insertion groove 464 of the RF electrode 480. Contact points may be formed at the contact area.

An RF power transmission path may be formed by metal-to-metal contact at the contact points. Among the first to fourth coil springs S1 to S4, the fourth coil spring S4 may be adjacent to a region in which plasma is generated.

Figure 16:
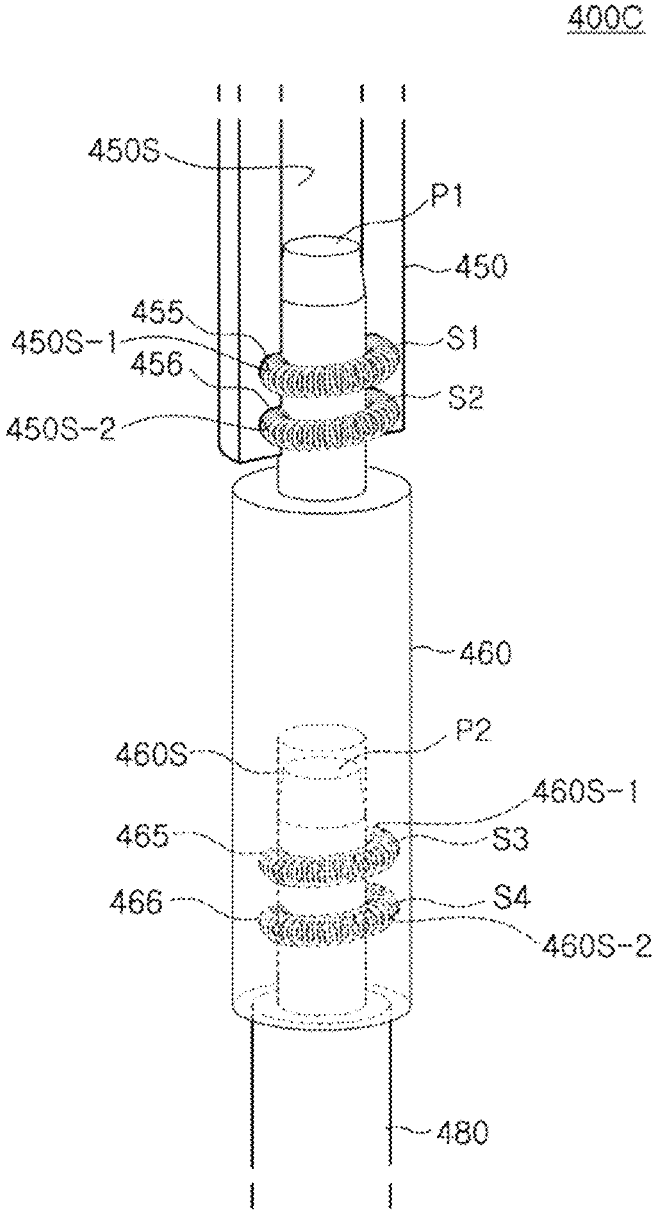
FIG. 16 is a schematic perspective view of a plasma generator according to some example embodiments of the present inventive concepts.

FIG. 16 is a schematic perspective view of a plasma generator according to some example embodiments of the present inventive concepts.

Referring to FIG. 16, a plasma generator 400C may include a coaxial tube assembly 450, a feed 460, and an RF electrode 480. One end of the coaxial tube assembly 450 may include a first recess. For example, as shown in FIG. 16, the coaxial tube assembly 450 may include a first inner circumferential surface 450S that defines a first recess at one end of the coaxial tube assembly 450. The coaxial tube assembly 450 may include a first conductive metal, an insulator formed to surround the first conductive metal, and a second conductive metal formed to surround the insulator, as described above. The first recess may be formed at one end of the first conductive metal. The feed 460 may include a first protrusion P1 at one (first) end and a second recess at the other (second) end. For example, as shown in FIG. 16, the feed 460 may include a second inner circumferential surface 460S that defines a second recess at the second end of the feed 460. One end of the RF electrode 480 may include a second protrusion P2.

Circular insertion grooves 455 and 456 may be formed on an inner circumferential surface of one end of the coaxial tube assembly 450. For example, as shown in FIG. 16, the coaxial tube assembly 450 may include first inner surfaces 450S-1 and 450S-2 that define separate, respective insertion groove 455 and 456 in the first inner circumferential surface 450S at the one end of the coaxial tube assembly 450. A circular coil spring may be inserted into the insertion grooves 455 and 456. Circular insertion grooves 465 and 466 may be formed on an inner circumferential surface of the other (second) end of the feed 460. For example, as shown in FIG. 16, the feed 460 may include second inner surfaces 460-S1 and 460S-2 that define separate, respective insertion grooves 465 and 466 in the second inner circumferential surface 460S at the second end of the feed 460. A circular coil spring may be inserted into the insertion grooves 465 and 466. In FIG. 16, it is illustrated that two insertion grooves 455 and 456 are formed at one end of the coaxial tube assembly 450 and two insertion grooves 465 and 466 are formed at the other end of the feed 460, but the number of insertion grooves may be variously modified. For example, in some example embodiments, insertion grooves 455 and 465 may be absent from the coaxial tube assembly 450 and the feed 460, respectively, such that only one “first” insertion groove 456 is present at the one end of the coaxial tube assembly 450 and only one “second” insertion groove 466 is present at the second end of the feed 460. While the coil springs S1 to S4 are described as “circular” coil springs, it will be understood that the coil springs inserted into the separate, respective insertion grooves 455, 456, 465, 466 may be different from circular coil springs, for example may be coil springs having a cross-section having a non-circular shape (e.g., a polygonal shape).

The first coil spring S1 may be inserted into the first insertion groove 455 formed at one end of the coaxial tube assembly 450, and the second coil spring S2 may be inserted into the second insertion groove 456 formed at one end of the coaxial tube assembly 450. A portion of the coil spring may protrude from the inner circumferential surface of the coaxial tube assembly 450 by a particular (or, alternatively, predetermined) length. The third coil spring S3 may be inserted into the third insertion groove 465 formed at the other end of the feed 460, and the fourth coil spring S4 may be inserted into the fourth insertion groove 466 formed at the other end of the feed 460. A portion of the coil spring may protrude from the inner circumferential surface of the feed 460 by a particular (or, alternatively, predetermined) length. A diameter of the insertion groove may be greater than a diameter of a cross-section of the coil spring. Accordingly, the coil spring may be easily mounted.

The first protrusion P1 of the feed 460 may be inserted into the first coil spring S1 and the second coil spring S2 inserted in the coaxial tube assembly 450. The first coil spring S1 and the second coil spring S2 may apply an elastic force to the feed 460 in a direction from the coaxial tube assembly 450 to the feed 460. Accordingly, the first coil spring S1 and the second coil spring S2 may support the feed 460. An inner circumferential surface of each of the first coil spring S1 and the second coil spring S2 may be in contact with the first protrusion P1 of the feed 460, and an outer circumferential surface of each of the first coil spring S1 and the second coil spring S2 may be in contact with each of the first insertion groove 455 and the second insertion groove 456 of the coaxial tube assembly 450. Contact points may be formed at the contact area.

The second protrusion P2 of the RF electrode 480 may be inserted into the third coil spring S3 and the fourth coil spring S4 inserted in the feed 460. The third coil spring S3 and the fourth coil spring S4 may apply an elastic force to the RF electrode 480 in a direction from the feed 460 to the RF electrode 480. Accordingly, the third coil spring S3 and the fourth coil spring S4 may support the RF electrode 480. An inner circumferential surface of each of the third coil spring S3 and the fourth coil spring S4 may be in contact with the second protrusion P2 of the RF electrode 480, and an outer circumferential surface of each of the third coil spring S3 and the fourth coil spring S4 may be in contact with each of the third insertion groove 465 and the fourth insertion groove 466 of the feed 460. Contact points may be formed at the contact area.

An RF power transmission path may be formed by metal-to-metal contact at the contact points. Among the first to fourth coil springs S1 to S4, the fourth coil spring S4 may be adjacent to a region in which plasma is generated.

According to some example embodiments of the present inventive concepts, the shape and number of energizing medium used at contact areas between dissimilar components existing in an RF power transmission path may be changed. Accordingly, RF power may be transferred without deterioration of components and plasma may be stably generated.

In addition, when both ends of the feed are manufactured as recesses, manufacturing easiness may be increased and the characteristics of the film quality after component improvement may be the same as that before component improvement.

While some example embodiments have been illustrated and described above, it will be apparent to those skilled in the art that modifications and variations could be made without departing from the scope of the present inventive concepts as defined by the appended claims.

What is claimed is:

1. A plasma generator, comprising:

a coaxial tube assembly including a first protrusion at one end of the coaxial tube assembly;

a radio frequency (RF) electrode including a second protrusion at one end of the RF electrode; and a feed including an inner circumferential surface that defines a first recess at a first end of the feed and a second recess at a second end of the feed, the second end of the feed being an opposite end of the feed in relation to the first end of the feed, wherein the first protrusion of the coaxial tube assembly is coupled to the first recess of the feed, wherein the second protrusion of the RF electrode is coupled to the second recess of the feed, wherein the feed includes one or more first inner surfaces that define a first insertion groove in the inner circumferential surface of the feed at the first end of the feed, wherein the feed includes one or more second inner surfaces that define a second insertion groove in the inner circumferential surface of the feed at the second end of the feed, wherein the plasma generator further includes a first coil spring that is at least partially within the first insertion groove and a second coil spring that is at least partially within the second insertion groove, and wherein the coaxial tube assembly, the RF electrode, and the feed are configured to provide an RF power transmission path based on the feed being coupled between the coaxial tube assembly and the RF electrode.

2. The plasma generator of claim 1, wherein a cross-section of each coil spring of the first coil spring and the second coil spring has a circular shape.

3. The plasma generator of claim 1, wherein a cross-section of each coil spring of the first coil spring and the second coil spring has a polygonal shape.

4. The plasma generator of claim 1, wherein an inner circumferential surface of the first coil spring is in contact with the first protrusion of the coaxial tube assembly, an inner circumferential surface of the second coil spring is in contact with the second protrusion of the RF electrode, an outer circumferential surface of the first coil spring is in contact with the first insertion groove of the feed, and an outer circumferential surface of the second coil spring is in contact with the second insertion groove of the feed.

5. The plasma generator of claim 1, wherein the feed includes a plurality of first inner surfaces that define separate, respective first insertion grooves of a plurality of first insertion grooves in the inner circumferential surface of the feed at the first end of the feed, the plurality of first insertion grooves including the first insertion groove, and the feed includes a plurality of second inner surfaces that define separate, respective second insertion grooves of a plurality of second insertion grooves in the inner circumferential surface of the feed at the second end of the feed, the plurality of second insertion grooves including the second insertion groove.

6. The plasma generator of claim 5, wherein one second insertion groove of the plurality of second insertion grooves is adjacent to a region of the plasma generator in which the plasma generator is configured to generate plasma.

7. The plasma generator of claim 1, wherein each coil spring of the first coil spring and the second coil spring includes at least one of aluminum (Al), nickel (Ni), copper (Cu), iron (Fe), titanium (Ti), or iridium (Ir).

8. A plasma generator, comprising:

a coaxial tube assembly including a first inner circumferential surface that defines a first recess at one end of the coaxial tube assembly;

a feed including a first protrusion at a first end of the feed and a second protrusion at a second end of the feed, the second end of the feed being an opposite end of the feed in relation to the first end of the feed; and a radio frequency (RF) electrode including a second inner circumferential surface that defines a second recess at one end of the RF electrode, wherein the first protrusion of the feed is coupled to the first recess of the coaxial tube assembly, wherein the second protrusion of the feed is coupled to the second recess of the RF electrode, wherein the coaxial tube assembly includes one or more first inner surfaces that define a first insertion groove in the first inner circumferential surface at the one end of the coaxial tube assembly, wherein the RF electrode includes one or more second inner surfaces that define a second insertion groove in the second inner circumferential surface at the one end of the RF electrode, wherein the plasma generator further includes a first coil spring that is at least partially within the first insertion groove and a second coil spring that is at least partially within the second insertion groove, and wherein the coaxial tube assembly, the RF electrode, and the feed are configured to provide an RF power transmission path based on the feed being coupled between the coaxial tube assembly and the RF electrode.

9. The plasma generator of claim 8, wherein a cross-section of each coil spring of the first coil spring and the second coil spring has a circular shape.

10. The plasma generator of claim 8, wherein a cross-section of each coil spring of the first coil spring and the second coil spring has a polygonal shape.

11. The plasma generator of claim 8, wherein an inner circumferential surface of the first coil spring is in contact with the first protrusion of the feed, an inner circumferential surface of the second coil spring is in contact with the second protrusion of the feed, an outer circumferential surface of the first coil spring is in contact with the first insertion groove of the coaxial tube assembly, and an outer circumferential surface of the second coil spring is in contact with the second insertion groove of the RF electrode.

12. The plasma generator of claim 8, wherein the coaxial tube assembly includes a plurality of first inner surfaces that define separate, respective first insertion grooves of a plurality of first insertion grooves in the first inner circumferential surface at the one end of the coaxial tube assembly, the plurality of first insertion grooves including the first insertion groove, and the RF electrode includes a plurality of second inner surfaces that define separate, respective second insertion grooves of a plurality of second insertion grooves in the second inner circumferential surface at the one end of the RF electrode, the plurality of second insertion grooves including the second insertion groove.

13. The plasma generator of claim 12, wherein one second insertion groove of the plurality of second insertion grooves is adjacent to a region of the plasma generator in which the plasma generator is configured to generate plasma.

14. The plasma generator of claim 8, wherein each coil spring of the first coil spring and the second coil spring includes at least one of aluminum (Al), nickel (Ni), copper (Cu), iron (Fe), titanium (Ti), or iridium (Ir).

15. A plasma generator, comprising:

a coaxial tube assembly including a first inner circumferential surface that defines a first recess at one end of the coaxial tube assembly;

a feed including a first protrusion at a first end of the feed and a second inner circumferential surface that defines a second recess at a second end of the feed, the second end of the feed being an opposite end of the feed in relation to the first end of the feed; and a radio frequency (RF) electrode including a second protrusion at one end of the RF electrode, wherein the first protrusion of the feed is coupled to the first recess of the coaxial tube assembly, wherein the second protrusion of the RF electrode is coupled to the second recess of the feed, wherein the coaxial tube assembly includes one or more first inner surfaces that define a first insertion groove in the first inner circumferential surface at the one end of the coaxial tube assembly, wherein the feed includes one or more second inner surfaces that define a second insertion groove in the second inner circumferential surface at the second end of the feed, wherein the plasma generator further includes a first coil spring that is at least partially within the first insertion groove and a second coil spring that is at least partially within the second insertion groove, and wherein the coaxial tube assembly, the RF electrode, and the feed are configured to provide an RF power transmission path based on the feed being coupled between the coaxial tube assembly and the RF electrode.

16. The plasma generator of claim 15, wherein a cross-section of each coil spring of the first coil spring and the second coil spring has a circular shape.

17. The plasma generator of claim 15, wherein a cross-section of each coil spring of the first coil spring and the second coil spring has a polygonal shape.

18. The plasma generator of claim 15, wherein an inner circumferential surface of the first coil spring is in contact with the first protrusion of the feed, an inner circumferential surface of the second coil spring is in contact with the second protrusion of the RF electrode, an outer circumferential surface of the first coil spring is in contact with the first insertion groove of the coaxial tube assembly, and an outer circumferential surface of the second coil spring is in contact with the second insertion groove of the feed.

19. The plasma generator of claim 15, wherein the coaxial tube assembly includes a plurality of first inner surfaces that define separate, respective first insertion grooves of a plurality of first insertion grooves in the first inner circumferential surface at the one end of the coaxial tube assembly, the plurality of first insertion grooves including the first insertion groove, and the feed includes a plurality of second inner surfaces that define separate, respective second insertion grooves of a plurality of second insertion grooves in the second inner circumferential surface at the second end of the feed, the plurality of second insertion grooves including the second insertion groove.

20. The plasma generator of claim 19, wherein one second insertion groove of the plurality of second insertion grooves is adjacent to a region of the plasma generator in which the plasma generator is configured to generate plasma.

* * * * *